(12) United States Patent
Liu et al.

(10) Patent No.: US 6,580,259 B2
(45) Date of Patent: Jun. 17, 2003

(54) HIGH EFFICIENCY AC-DC CONVERTER WITH POWER FACTOR CORRECTOR

(75) Inventors: Joe Chui Pong Liu, Kwai Hing (HK); Franki Ngai Kit Poon, Kowloon (HK); Man Hay Pong, Ap Lei Chau (HK)

(73) Assignee: The University of Hong Kong, Hong Kong (HK)

( * ) Notice: Subject to any disclaimer, the term of this patent is extended or adjusted under 35 U.S.C. 154(b) by 0 days.

(21) Appl. No.: 10/040,841

(22) Filed: Jan. 7, 2002

(65) Prior Publication Data

US 2002/0110012 A1 Aug. 15, 2002

Related U.S. Application Data

(60) Provisional application No. 60/262,186, filed on Jan. 17, 2001.

(51) Int. Cl.[7] ................................................ G05F 1/40
(52) U.S. Cl. ...................................... 323/282; 323/222
(58) Field of Search ................................ 323/222, 223, 323/224, 273, 266, 282; 363/59

(56) References Cited

U.S. PATENT DOCUMENTS 5,264,782 A * 11/1993 Newton ...................... 323/288
5,627,460 A * 5/1997 Bazinet et al. ............... 323/288
5,737,204 A * 4/1998 Brown ......................... 363/89
5,894,412 A * 4/1999 Faulk ........................... 363/17
5,907,223 A * 5/1999 Gu et al. ..................... 315/247
5,969,484 A * 10/1999 Santi et al. .................. 315/247
6,404,174 B1 * 6/2002 Boudreaux et al. ......... 323/273
6,515,463 B2 * 2/2003 Ling ........................... 323/315

* cited by examiner

Primary Examiner—Adolf Deneke Berhane
(74) Attorney, Agent, or Firm—Jones Day

(57) ABSTRACT

An AC/DC power converter includes a pair of input terminals, a boost unit, a DC/DC converter, a coupler chain, and a discharge chain. The pair of input terminals connect to a pulsating DC source. The boost unit is coupled to the input terminals and generates a voltage higher than the voltage at the input terminals. The DC/DC converter couples to the boost unit and includes a set of series switches coupled to the primary side of a transformer through a series inductor and capacitor. The DC/DC converter further includes a secondary winding coupled to the transformer and coupled to a rectifier and filter configuration. The coupler chain couples the boost unit to the DC/DC converter. The discharge chain couples the coupler chain to the high voltage source generated by the boost unit. Control pulses synchronize the series switches so that a resonant current flows in the coupler chain and the discharge chain such that the switches can be turned on and off while voltages across the switches are substantially zero.

18 Claims, 6 Drawing Sheets

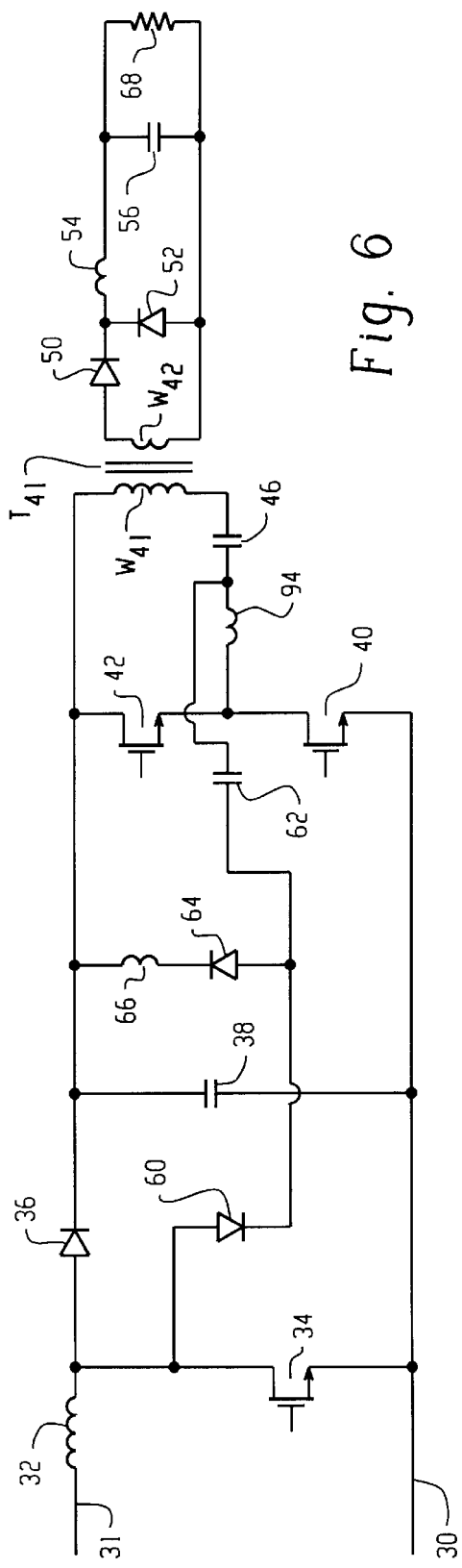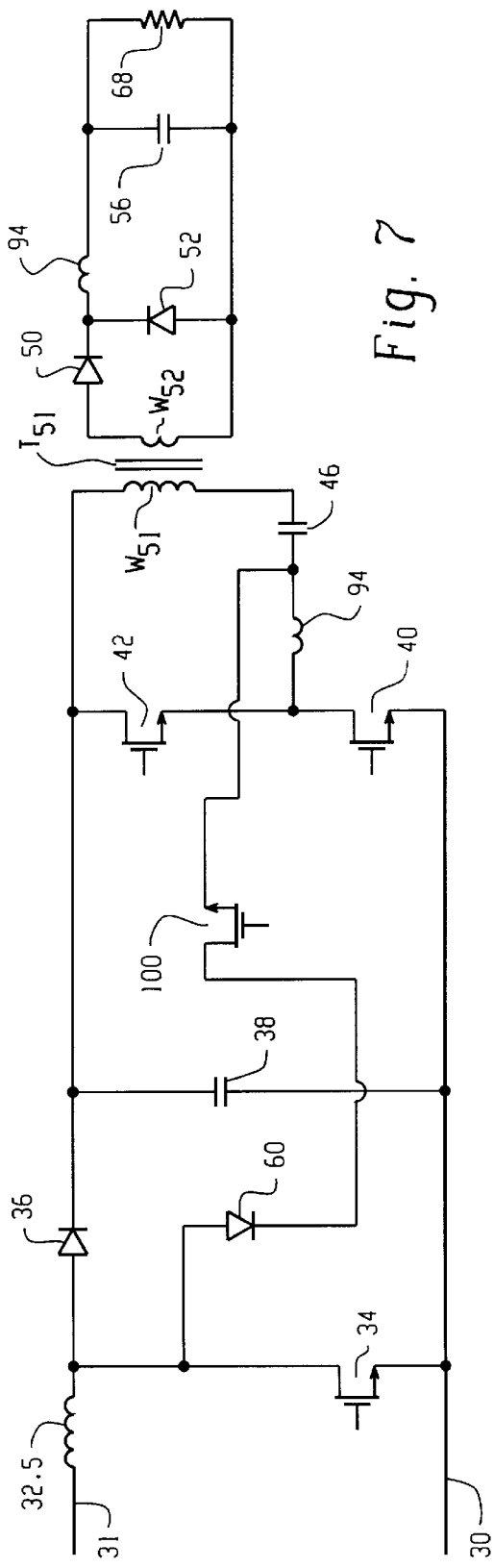

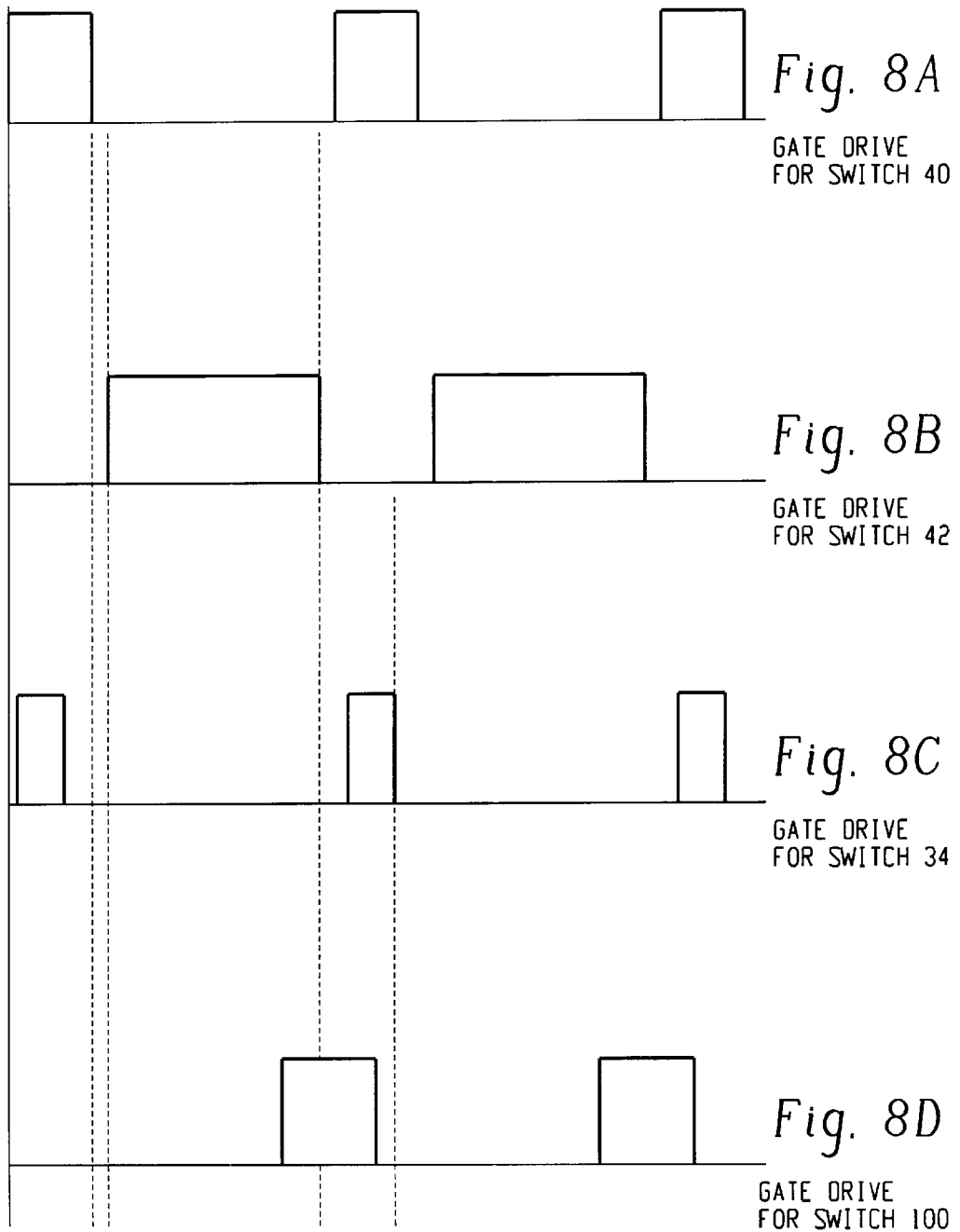

HIGH EFFICIENCY AC-DC CONVERTER WITH POWER FACTOR CORRECTOR

CROSS-REFERENCE TO RELATED APPLICATION

This application claims priority from and is related to U.S. Provisional Application No. 60/262,186, filed on Jan. 17, 2001, and entitled "A High Efficiency AC-DC Converter With Power Factor Corrector." U.S. Provisional Application No. 60/262,186, including the entire written description and drawing figures, is hereby incorporated by reference into the present application.

BACKGROUND

1. Field of the Invention

This invention relates to the field of power converters. Particularly, this invention relates to the field of AC to DC converters with Power Factor Correction (PFC).

2. Description of the Related Art

AC/DC converters need power factor correction in order to fulfill international standards of low input harmonic current content. A front-end boost PFC converter is one way to obtain good input harmonic current to meet these international standards. Generally, another DC/DC converter is cascaded from the front-end boost PFC converter to provide a steady output voltage.

FIG. 1 shows a typical configuration of an AC-DC converter with power factor correction. Rectified AC is fed to input terminals of a boost converter 4 at nodes 0 and 1. The boost converter 4 includes an inductor $L_1$ 10, MOSFET switch $M_1$ 12, diode $D_1$ 14 and capacitor $C_1$ 16. A series of Pulse Width Modulated (PWM) voltage pulses are fed to the gate terminal $G_1$ of the MOSFET switch 12. The pulse width of the voltage pulses are programmed to make the input current follow the shape of the input sinusoidal voltage and build up a voltage across capacitor 16. A DC/DC converter 20 converts the voltage across capacitor 16 to a regulated DC voltage across output nodes 5 and 6.

A problem in boost converters is the reverse current of the diode 14 when the switch 12 turns on. When the switch 12 turns on, it draws reverse recovery current through the diode 14 and turns the switch 12 off abruptly to block the reverse voltage equal to the output voltage of the boost PFC converter 4. The output voltage is always higher than the peak of the rectified AC and very often is close to 400V. This high output voltage causes a large amount of switching loss when the diode 14 is turned off. This switching loss increases with frequency. However, high switching frequency is often required to reduce the size and weight of the passive components. Thus PFC boost converter 4 generally are lossy circuits due to the high switching frequencies of the circuit. In fact, the switching loss is associated with every switch in the boost converter 4 and every switch in the DC/DC converter 20.

Previous work uses various techniques to reduce switching losses. In U.S. Pat. No. 5,313,382, Farrington discloses a boost converter with an auxiliary switch and a resonant network to achieve reduced voltage stress at a main power switch during turn on. The boost converter also enables a soft turn off of the boost rectifier. The auxiliary switch of the boost converter is turned on without reduced voltage condition, but it has a zero current condition. In U.S. Pat. No. 5,633,579, Kim discloses a boost converter with a stress energy reproducing snubber circuit in order to reduce the stress energy of the boost rectifier during turn off. The snubber circuit reduces the voltage stress on a main switch of the boost converter during turn on. In U.S. Pat. No. 5,748,457, Poon discloses a DC/DC converter which reduces voltage stress by means of zero voltage switching, but it has no boosting and power factor correction effect.

In addition to soft switching, another problem with PFC converters is control of the switching. Some prior art techniques attempt to integrate the PFC converter and the DC/DC converter. Most of these prior art techniques include converters with fewer degrees of freedom which results in restrictions to operate the converters in certain modes, such as the discontinuous mode. These restrictions prevent maximized utilization of all the components.

SUMMARY OF THE INVENTION

A power converter includes a pair of input terminals, a boost unit, a DC/DC converter, a coupler chain, and a discharge chain. The pair of input terminals connect to a pulsating DC source. The boost unit is coupled to the input terminals and generates a voltage higher than the voltage at the input terminals. The DC/DC converter couples to the boost unit and includes a set of series switches coupled to the primary side of a transformer through a series inductor and capacitor. The DC/DC converter further includes a secondary winding coupled to the transformer and coupled to a rectifier and filter configuration. The coupler chain couples the boost unit to the DC/DC converter. The discharge chain couples the coupler chain to the high voltage source generated by the boost unit. Control pulses synchronize the series switches so that a resonant current flows in the coupler chain and the discharge chain such that the switches can be turned on and off while voltages across the switches are substantially zero.

BRIEF DESCRIPTION OF THE DRAWINGS

FIG. 6 shows a circuit comprising a fourth embodiment of the present invention;

FIG. 7 shows a circuit comprising a fifth embodiment of the present invention; and FIGS. 8A to 8D show graphs of the driving waveforms for the switches of the circuit of FIG. 7.

DETAILED DESCRIPTION OF THE PREFERRED EMBODIMENTS

Figure 1:
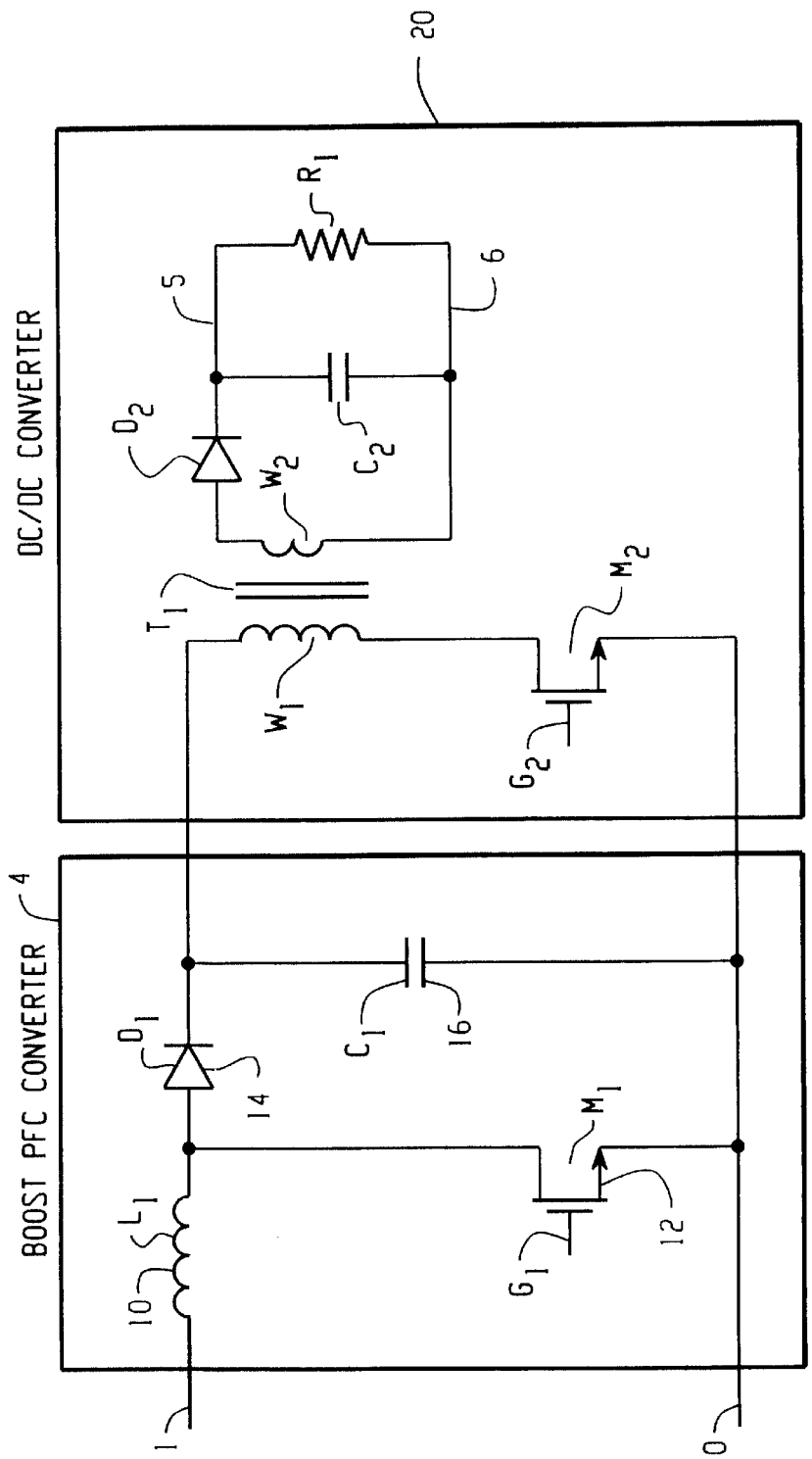
FIG. 1 (Prior Art) shows a typical configuration of an AC-DC converter with power factor correction.
Figure 2:
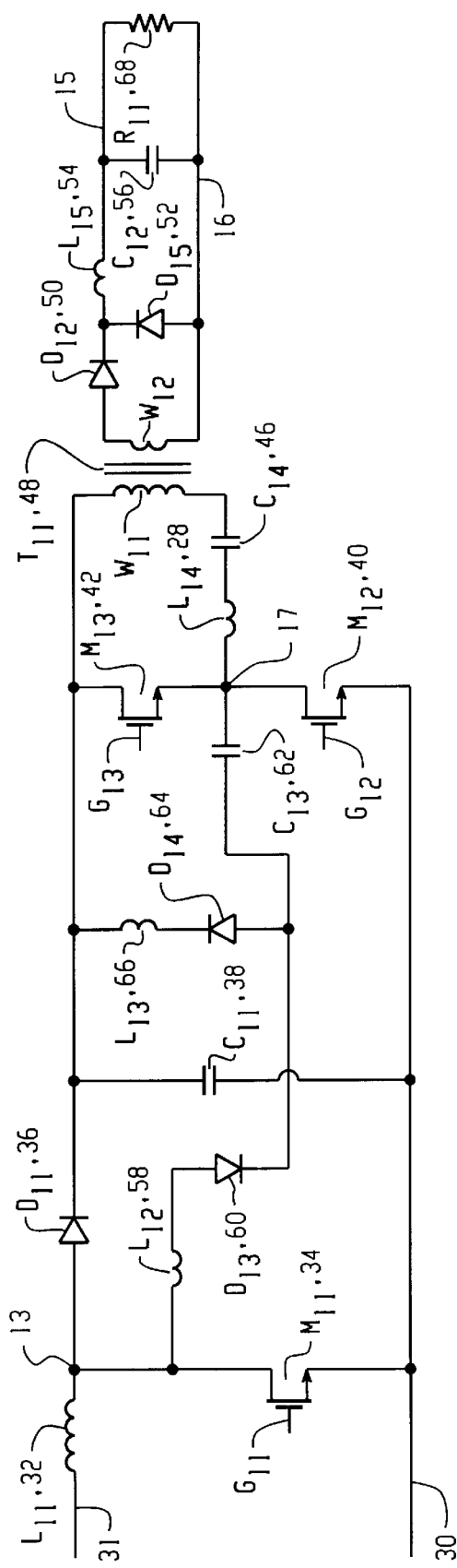
FIG. 2 shows a circuit comprising a first embodiment of the present invention.

With respect to the drawing figures, a circuit comprising a first embodiment of the present invention is shown in FIG. 2. The invention includes various interconnected parts that define a plurality of devices that can function together. The circuit includes a boost converter, a DC/DC converter, a coupler chain, a discharging chain, and a soft switch inductor 28. The boost converter includes an inductor 32, a MOSFET switch 34, a diode 36 and a capacitor 38. The DC/DC converter includes MOSFET switches 40 and 42, a capacitor 46. A transformer 48 in the DC/DC converter, having windings $W_{11}$ and $W_{12}$, couples the switches 40 and 42 to diodes 50 and 52 which are coupled to an inductor 54 and a capacitor 56. The resistance 68 is the load of the converter. The coupler chain includes an inductor 58, a diode 60 and a capacitor 62. The discharge chain includes a diode 64 and an inductor 66.

Input terminals 30 and 31 are coupled to a rectified AC source. The input terminals 30 and 31 feed the boost converter. A series of Pulse Width Modulated (PWM) voltage pulses are injected into the boost converter on the gate $G_{11}$ of the switch 34. The PWM signal is programmed to make the shape of the averaged input current follow the shape of the input voltage and produce a high power factor. A boosted voltage across the capacitor 38 is then the input voltage of the DC/DC converter. The MOSFET switches 40 and 42 are programmed to turn on and turn off to give a regulated output voltage. These switches 40 and 42 are coupled to the switch 34 through the coupler chain, which couples the boost converter to the DC/DC converter. The discharge chain couples the coupler chain to the input of the DC/DC converter so that the discharge chain can discharge the capacitor 62 and the inductor 58 of the coupler chain.

The soft switch inductor 28 is coupled to switches 40 and 42. The circuit as a whole operates the switches 34, 40, and 42 so as to soft switch each of the switches 34, 40, and 42 in the circuit. When the switch 42 turns off from its on state, current in the inductor 28 continues to flow and exchanges charge in capacitance across the switches 42 and 40. The voltage across the switch 40 then falls to zero.

The switch 40 is programmed to turn on at zero voltage. When the voltage across the switch 40 falls, then the coupler chain of components is activated because the boost switch 34 is in the off state and the diode 36 is conducting. A resonant current flows through this chain and pulls current from the boost inductor 32. Current through the diode 36 is reduced at a controlled rate and the turn off loss through the diode 36 is largely reduced. The resonant current will eventually become larger than the inductor current, which causes the diode 36 to turn off. The voltage across the switch 34 continues to fall under the influence of the resonant current in the coupler chain until it becomes substantially zero. Then, the switch 34 is programmed to turn on and the switching loss of the switch 34 is substantially reduced.

After the switch 34 remains on for the period of time needed by the boost converter, the switch 34 may be turned off regardless of the state of switches 40 and 42. These switches 40 and 42 are complementary, such that when one switch is on the other switch is off. A small time gap between switches avoids shoot through. The time gap is very small and it is regarded that 40 and 42 operate asymmetrically. Thus, as the switch 34 is turned off, there are two cases of operability for switches 40 and 42. A first case where the switch 40 is on and the switch 42 is off, and a second case where the switch 40 is off and the switch 42 is on.

In the first case, the capacitor 62 is settled to a voltage, when the switch 34 turns off, current is diverted to the capacitor 62 which acts like a snubber capacitor. Its voltage will eventually settle to the line voltage after the switch 34 has turned off.

In the second case, the capacitor 62 has discharged to near zero and does not interfere with the switching off of the switch 34. Current flows through the inductor 32 and the boost diode 36 like the current would in prior art boost converter.

The states of switches 40 and 42 may also be changed at any time after the switch 34 has turned on at the beginning of a duty cycle. Again there are two cases when the switch 40 turns off and the switch 42 turns on. The first case is where the switch 34 is still on and the second case is where the switch 34 is off. In both cases, the diode 60 prevents the initiation of resonant current through the inductor 58. When the switch 40 is turned off, energy in the inductor 28 attempts to raise the voltage across the switch 40 and reduce the voltage across the switch 42. Resonance in the coupler chain discharges the charge on the capacitor 62. When the voltage across the switch has fallen to substantially zero it is programmed to turn on. Thus the switch 42 can turn on at a voltage substantially close to zero. The switch 42 remains on for its designated duty cycle. When the switch 42 is turned off, its current has changed direction, the voltage of the capacitor 62 is zero and the whole switching process will repeat.

Figure 3:
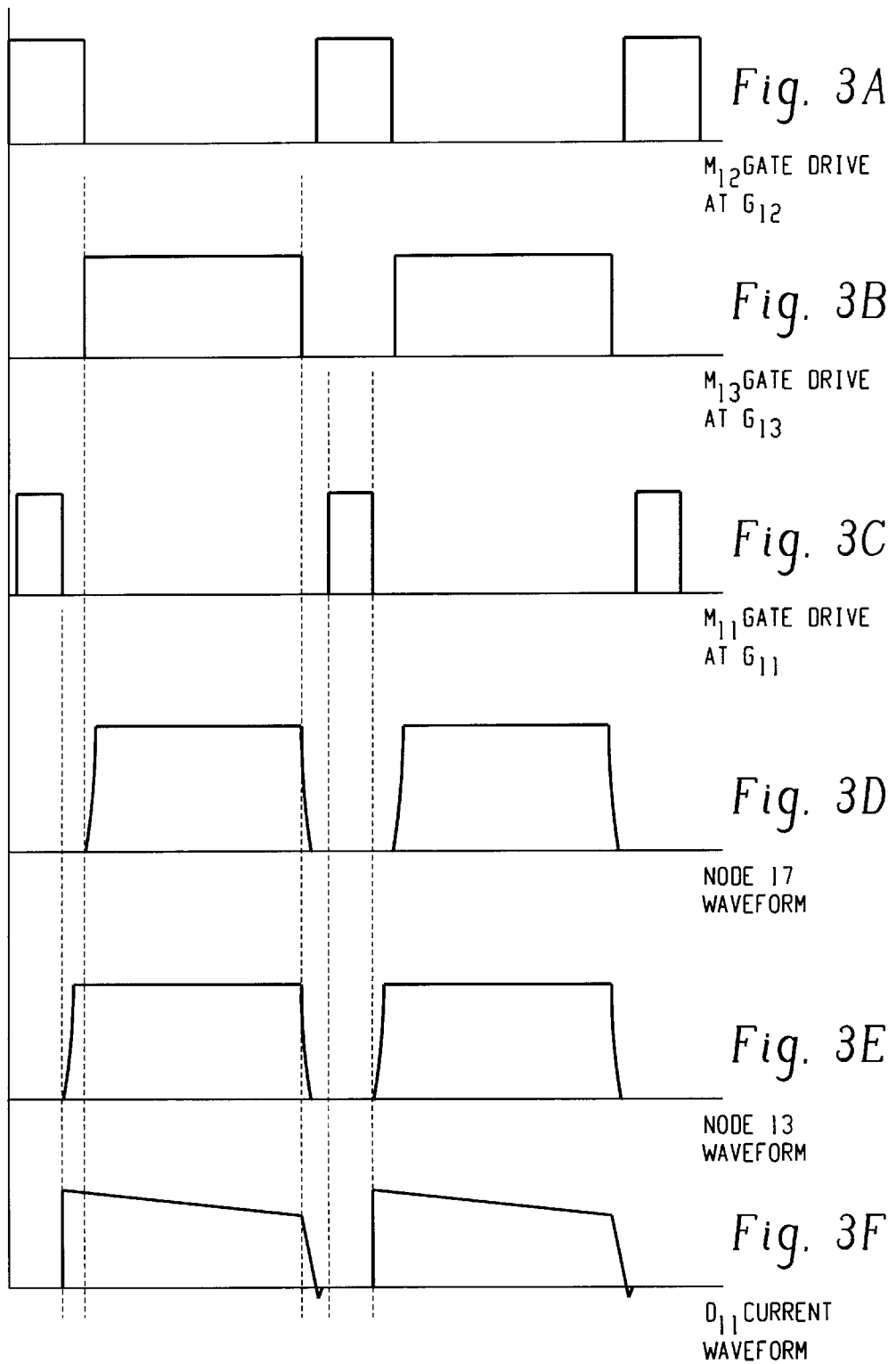
FIGS. 3A to 3F show graphs of voltage and current during operation of the circuit of FIG. 2.

With respect to drawing FIGS. 3A to 3F, the graphs of voltage and current during operation of the circuit of FIG. 2 are shown. FIGS. 3A and 3B show typical asymmetric gate driving pulses for the MOSFET switches 40 and 42. The duty cycle of the control pulses are programmed to maintain a regulated DC output voltage at the converter output terminal across the resistor 68 shown in FIG. 2. A small idling time period is inserted between the turn off and turn on of the switches 40 and 42, as shown in the timing of the gate pulses to drive the switches in FIGS. 3A, 3B and 3C. The switch 34 (FIG. 3A) in the boost converter is turned on shortly after the switch 40 (FIG. 3B) in the DC/DC converter has turned on but may turn off at any time in the cycle as explained above.

In FIGS. 3D and 3E, when the switch 42 turns off, current in the inductor 28 pulls the voltage at the drain terminals of the switches 40 and 34 at nodes 17 and 13 respectively, although these voltages may not fall at the same time and rate. Also, FIG. 3D shows that when the switch 40 turns off, the current flowing in the inductor 28 will push the voltage at node 17 high and reduce the voltage across the switch 42. The gate driving pulse will turn on the switch 42 when its drain source voltage has dropped to substantially zero. In FIG. 3F, current through the diode 36 decreases in this transient period until it reaches zero. The switch 34 is programmed to turn on after its voltage is substantially zero. The same switching applies to the switch 40 which is programmed to turn on after its voltage is substantially zero. Thus, both switches 34 and 40 have zero voltage turn on. The diode 36 can then switch off with less reverse current. FIG. 3F shows the current slope of the diode 36 has been limited, the reverse current can be controlled to be small which limits any significant losses. Thus, all switches 34, 40 and 42 may turn on at zero voltage state.

Figure 4:
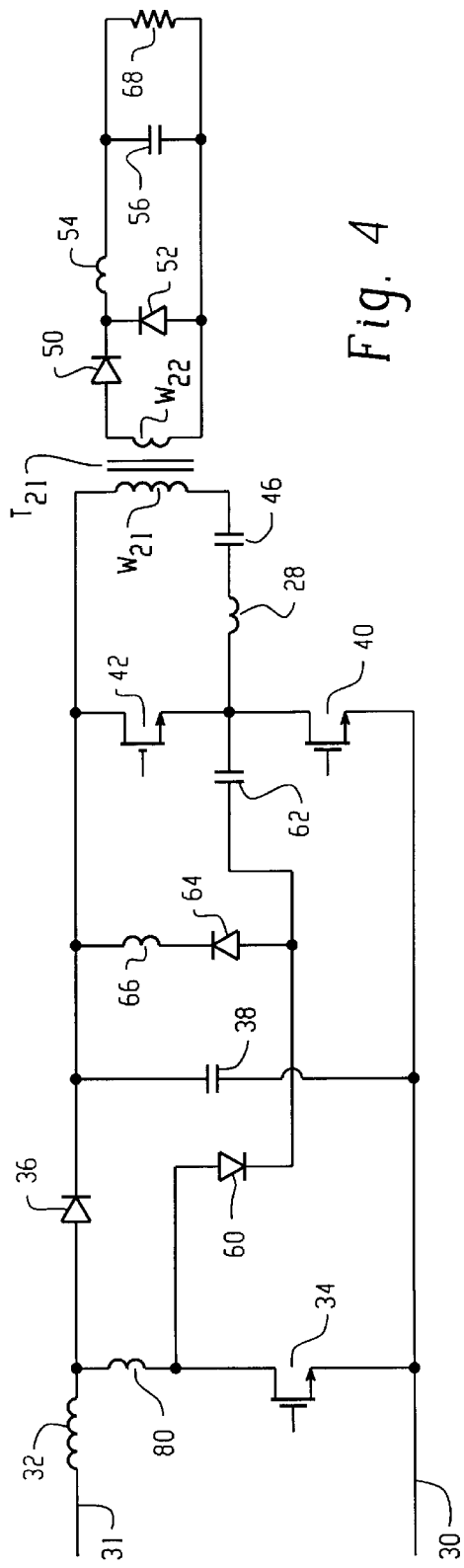
FIG. 4 shows a circuit comprising a second embodiment of the present invention.

With respect to FIG. 4, a second embodiment of the present invention is shown. This second embodiment differs from the first embodiment in the placement of a small inductor 80 for resonance to provide zero voltage switching of the switch 34 in the boost converter. In the first embodiment, the small inductor 58 is placed in the coupling chain of components connecting the boost converter and the DC/DC converter. Nevertheless, this is not the only location to place the inductor. In this second embodiment, the inductor 80 is placed in series with the switch 34 in the boost converter. The switches 34, 40 and 42 are controlled similar to the switches in FIG. 2, and the output of the circuit is similar.

When the switch 34 switches off and the capacitor 62 has discharged to near zero, the energy stored in the inductor 80 is released through the diode 60 and flows through the coupling and discharging branches. The current through the inductor 80 settles to zero and the inductor current through the inductor 32 will flow through the boost diode 36 similar to other boost converters.

Figure 5:
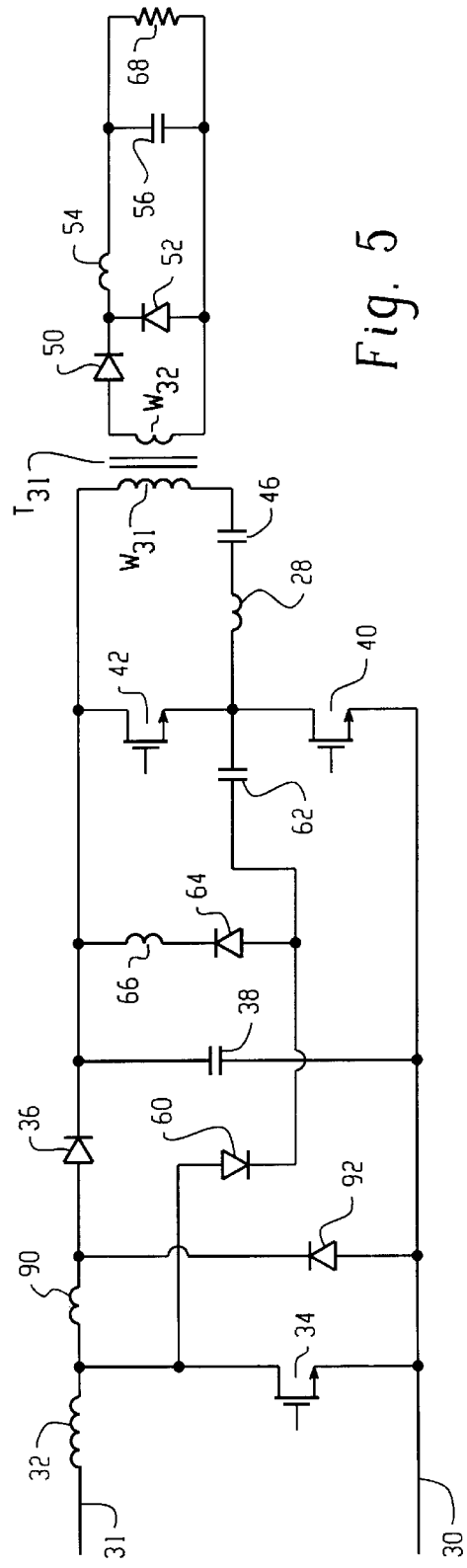
FIG. 5 shows a circuit comprising a third embodiment of the present invention.

A third embodiment of the present invention is shown in FIG. 5. This third embodiment differs from the first two embodiments in the placement of a small inductor 90 and a diode 92 for resonance to provide zero voltage switching of the switch in the boost converter. This third embodiment has the inductor 90 placed in between the input inductor 32 and the diode 36 of the boost converter. Another leg, which includes the diode 92, is placed in the circuit between the inductor 90 and the diode 36, and is then extended to the input terminal 30. The switches 34 and 40 act substantially the same in this embodiment as they act in the first embodiment. When the voltage across the switch 40 falls, the voltage across the switch 34 falls simultaneously due to the coupling of the switches by the capacitor 62.

The aforementioned embodiments use two small inductors, one coupled to the boost diode 36 and another one placed near the DC/DC converter primary side switches 40 and 42, to obtain less voltage stress during turn off of the diode 36 and turn on of the switches 40 and 42. Nevertheless, it is possible to combine these two small inductors into one inductor to further reduce the converter component count.

Turning now to FIG. 6, a circuit comprising a fourth embodiment of the present invention is shown. The embodiment is similar to the first embodiment, except the inductor 58 (FIG. 2) in the coupler chain and the soft switching inductor 28 (FIG. 2) are combined into a single inductor 94 coupled to the switches 40 and 42. The inductor 94 provides soft turn off of diode 36 and also reduces voltage stress turn on of the switches 34, 40, and 42.

When the switch 40 turns off, the current flowing in the series inductor 94 will continue to flow and discharge the stray capacitance across the drain source of the switch 40. The voltage across the switch 42 will drop accordingly. The switch 40 then turns on when the voltage across the switch 40 drops to zero. The current flow direction of the inductor 90 then reverses and shunts the current flowing through the boost diode 36. The inductor 94 also discharges the stray capacitance of the switch 34 via the path comprising the diode 60 and the energy limiting capacitor 62. The voltage across the switch 34 then falls. When the voltage drops to essentially zero, then the switch 34 can be turned on with no switching loss. The rate of fall of current and the reverse recovery current during the turn off of the diode 36 is limited by the inductor 94, therefore the turn off losses of the boost diode 36 can also be reduced.

Turning now to FIG. 7, a circuit comprising a fifth embodiment of the present invention is shown. This embodiment functions similar to the first embodiment, but the component count of this circuit is less. The capacitor 62 in the coupler chain and the discharge chain of the first embodiment are replaced by an active switch 100, which couples the boost converter to the DC/DC converter. The coupler chain, including the diode 60, the switch 100 and the inductor 94, can softly turn off the boost diode 36 and reduce the turn on voltage of the switch 34 by selecting proper gate driving timing of the four switches 34, 40, 42, and 100. The inductor 94 provides soft turn off of the diode 36 and reduces voltage stress turn on for the switches 34, 40, and 42.

In the previous embodiments, an energy limiting capacitor 62 limits energy transfer from the PFC boost converter side to the DC/DC converter side. Another diode 64 and an inductor 66 release the stored energy of the capacitor 62 through the discharge chain. In the fifth embodiment, these components are replaced by the small active switch 100 which limits the energy transfer between the boost converter and the DC/DC converter during the switching transient by timing the gate signals of the switch 100 based upon the timing signals for the other gates 34, 40, and 42.

With respect to FIGS. 8A to 8D, graphs of the driving waveforms for the switches of the circuit of FIG. 7 are shown. FIGS. 8A to 8C are similar to FIGS. 3A to 3C, which are the gate drives for the switches 40, 42, and 34, respectively. As shown in FIG. 8D, the additional switch 100 is programmed to turn on before the switch 42 turns off. The switch 100 remains on throughout the transient during which the switches 34 and 40 switch on softly and the switch 42 turns off softly. Afterwards, this auxiliary switch 100 will then turn off and stop energy flow between the boost converter and the DC/DC converter side. This auxiliary switch 100 does not need to handle main power transfer, and it can be a very small MOSFET which operates for a short period of time.

The embodiments described herein are examples of structures having elements corresponding to the elements of the invention recited in the claims. This written description may enable those skilled in the art to make and use embodiments having alternative elements that likewise correspond to the elements of the invention recited in the claims. The intended scope of the invention thus includes other structures that do not differ from the literal language of the claims, and further includes other structures with insubstantial differences from the literal language of the claims.

What is claimed is:

1. A power converter apparatus, comprising:
a pair of input terminals for connection to a pulsating DC source;
a boost unit with at least a first inductor, a first switch, a first rectifier and a first capacitor which is coupled to the input terminals and produce a voltage higher than the voltage at said input terminals;
means to couple the high voltage of said boost unit to a second switch and a third switch connected in series which produce a series of voltage pulses feeding into the primary side of a transformer through a second inductor and a second capacitor connected in series;
at least one secondary winding coupled to said transformer and this secondary winding is coupled to a set of rectifier and filter configuration for feeding power to an output load;
a first chain of components consisting of at least a third resonant inductor, a third resonant capacitor and a second diode, which is coupled to a node joining said first switch and first diode in said boost unit and another node joining said second and third switches;
a second chain of components consisting of at least a fourth resonant inductor and a third diode which is coupled to said third resonant capacitor in said first chain and a node attached to the high voltage source generated by said boost unit;
means to synchronize all the switches so that resonant current flows in said first and second chain such that the switches can be turned on and off while voltages across them are essentially zero.

2. A power converter apparatus, comprising:
a pair of input terminals for connection to a pulsating DC source;
a boost unit with at least a first inductor, a first switch, a first rectifier diode and a first capacitor which is coupled to said input terminals and produce a voltage higher than the voltage at said input terminals;

means to couple the high voltage of said boost unit to a second switch and a third switch connected in series which produce a series of voltage pulses feeding into the primary side of a transformer through a second series inductor and a second series capacitor;

at least one secondary winding coupled to said transformer and this secondary winding is coupled to a set of rectifier and filter configuration for feeding power to an output load;

a third inductor for resonance coupled between the anode of said first rectifier in said boost unit and said first switch in this said boost unit;

a first chain of components consisting of at least a third capacitor for resonance and a second diode, which is coupled to a node joining said first switch and said third resonant inductor and another node joining said second and third switches;

a second chain of components consisting of at least a fourth resonant inductor and a third diode which is coupled to said third resonant capacitor in said first chain and a node attached to the high voltage source generated by said boost unit;

means to synchronize all the switches so that resonant current flows in the first and second chain such that the switches can be turned on and off while voltages across them are essentially zero.

3. A power converter apparatus, comprising:

a pair of input terminals for connection to a pulsating DC source;

a boost unit with at least a first inductor, a first switch, a first rectifier diode and a first capacitor which is coupled to the input terminals and produce a voltage higher than the voltage at said input terminals;

means to couple the high voltage of said boost unit to a second switch and a third switch connected in series which produce a series of voltage pulses feeding into the primary side of a transformer through a second inductor and a second capacitor connected in series;

at least one secondary winding coupled to said transformer and this secondary winding is coupled to a set of rectifier and filter configuration for feeding power to an output load;

a third inductor for resonance coupled between the anode of said first rectifier in said boost unit and said first switch in this said boost unit;

a first chain of components consisting of at least a third capacitor for resonance and a second diode, which is coupled to a node joining said first switch and said third resonant inductor in said boost unit and another node joining said second and third switches;

a second chain of components consisting of at least a fourth resonant inductor and a third diode which is coupled to said third resonant capacitor in said first chain and a node attached to the high voltage source generated by said boost unit;

a fourth diode with its anode coupled to said first switch and cathode coupled to anode of first rectifier diode;

means to synchronize all switches so that resonant current flows in said first and second chain such that all switches can be turned on and off while voltages across them are essentially zero.

4. A power converter apparatus, comprising:

a pair of input terminals for connection to a pulsating DC source;

a boost unit with at least a first inductor, a first switch, a first rectifier diode and a first capacitor which is coupled to the input terminals and produce a voltage higher than the voltage at said input terminals;

means to couple the high voltage of said boost unit to a second switch and a third switch connected in series which produce a series of voltage pulses feeding into the primary side of a transformer through a second inductor and a second capacitor connected in series;

at least one secondary winding coupled to said transformer and this secondary winding is coupled to a set of rectifier and filter configuration for feeding power to an output load;

a first chain of components consisting of at least a third capacitor for resonance and a second diode, which is coupled to a node joining said first switch and said first diode in said boost unit and another node joining said second capacitor and said second inductor in the primary circuit of said transformer;

a second chain of components consisting of at least a third resonant inductor and a third diode which is coupled to said third capacitor in said first chain and a node attached to the high voltage source generated by said boost unit;

means to synchronize all the switches so that resonant current flows in the first and second chain such that the switches can be turned on and off while voltages across them are essentially zero.

5. A power converter apparatus, comprising:

a pair of input terminals for connection to a pulsating DC source;

a boost unit with at least a first inductor, a first switch, a first rectifier diode and a first capacitor which is coupled to the input terminals and produce a voltage higher than the voltage at said input terminals;

means to couple the high voltage of said boost unit to a second switch and a third switch connected in series which produce a series of voltage pulses feeding into the primary side of a transformer through a second inductor and a second capacitor connected in series;

at least one secondary winding coupled to said transformer and this secondary winding is coupled to a set of rectifier and filter configuration for feeding power to an output load;

a first chain of components consisting of at least a fourth switch and a second diode, which is coupled to a node joining said first switch and said first diode in said boost unit and another node joining said second capacitor and said second inductor in the primary circuit of said transformer;

means to synchronize all switches so that resonant current flows in the first and second chain such that the switches can be turned on and off while voltages across them are essentially zero.

6. A power converter apparatus, comprising:

a pair of input terminals for connection to a pulsating DC source;

a boost unit coupled to the input terminals and generating a voltage higher than the voltage at the input terminals;

a DC/DC converter coupled to the boost unit and comprising series switches coupled to the primary side of a transformer through a series inductor and capacitor, and further including a secondary winding coupled to the transformer and coupled to a rectifier and filter configuration;

a coupler chain coupling the boost unit to the DC/DC converter;

a discharge chain coupled to the coupler chain and coupled to a high voltage source generated by the boost unit; and control pulses synchronizing the series switches so that a resonant current flows in the coupler chain and the discharge chain such that the switches can be turned on and off while voltages across the switches are substantially zero.

7. The power converter of claim 6, wherein said coupler chain comprises an inductor, a diode, and a capacitor.

8. The power converter of claim 7, wherein the discharge chain comprises a diode and an inductor.

9. The power converter of claim 7, wherein the series inductor of the DC/DC converter is also the inductor of the coupler chain.

10. The power converter of claim 6, wherein the coupler chain comprises a capacitor and a diode.

11. The power converter of claim 10, wherein a diode is coupled between one of the input terminals and the boost unit.

12. The power converter of claim 6, wherein the output of the transformer is coupled to a rectifier.

13. The power converter of claim 12, wherein the rectifier is coupled to a filter.

14. A power converter apparatus, comprising:

a pair of input terminals for connection to a pulsating DC source;

a boost unit comprising a first inductor, a first switch, a first rectifier diode and a first capacitor coupled to the input terminals and producing a voltage higher than the voltage at said input terminals;

means to couple the high voltage of the boost unit to a second switch and a third switch connected in series, the second and third switches feeding a series of voltage pulses into the primary side of a transformer through a second series inductor and a second series capacitor;

a secondary winding coupled to the transformer and coupled to a rectifier and filter for feeding power to an output load;

a third inductor coupled between the anode of the first rectifier in the boost unit and the first switch in the boost unit, the third inductor configured to resonate a current flow;

a first chain of components comprising a third capacitor and a second diode coupled to a node joining the first switch and the third inductor;

a second chain of components comprising a fourth inductor and a third diode coupled to the third capacitor in the first chain, the second chain being coupled to the high voltage source generated by the boost unit; and means to synchronize the switches so that the resonant current flows in the first and second chain such that the switches can be turned on and off while voltages across the switches are substantially close to zero.

15. A power converter apparatus, comprising:

a pair of input terminals for connection to a pulsating DC source;

a boost unit coupled to the input terminals and generating a voltage higher than the voltage at the input terminals;

a DC/DC converter coupled to the boost unit and comprising series switches coupled to the primary side of a transformer through a series inductor and capacitor, and further including a secondary winding coupled to the transformer and coupled to a rectifier and filter configuration;

a coupler chain coupling the boost unit to the DC/DC converter; and control pulses synchronizing the series switches so that a resonant current flows in the coupler chain and the discharge chain such that the switches can be turned on and off while voltages across the switches are substantially zero.

16. The power converter of claim 15, wherein the coupler chain comprises a diode and a switch.

17. The power converter of claim 15, wherein the output of the transformer is coupled to a rectifier.

18. The power converter of claim 17, wherein the rectifier is coupled to a filter.

* * * * *